US009674050B2

(12) United States Patent
Martin et al.

(10) Patent No.: US 9,674,050 B2
(45) Date of Patent: *Jun. 6, 2017

(54) HANDHELD DEVICE FOR ON-SITE DATACENTER MANAGEMENT

(71) Applicant: PayPal, Inc., San Jose, CA (US)

(72) Inventors: Jean-Christophe Martin, San Jose, CA (US); Kevin Thayer, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 14/456,615

(22) Filed: Aug. 11, 2014

(65) Prior Publication Data

US 2014/0351406 A1    Nov. 27, 2014

Related U.S. Application Data

(63) Continuation of application No. 12/755,289, filed on Apr. 6, 2010, now Pat. No. 8,803,660.

(51) Int. Cl.
*H04L 12/24* (2006.01)
*H04W 8/00* (2009.01)
*G08C 21/00* (2006.01)

(52) U.S. Cl.
CPC .............. *H04L 41/50* (2013.01); *G08C 21/00* (2013.01); *H04W 8/00* (2013.01)

(58) Field of Classification Search
CPC ..... G08C 21/00; H04L 41/50; H04L 41/0226; H04L 41/0253; H04L 41/04; H04L 67/18; H04L 2209/80; H04W 8/00; H04W 8/005; G06F 3/04815; G06F 11/3006; G06Q 10/08; G06Q 10/087; G09G 3/003; H05K 7/1498

(Continued)

(56) References Cited

U.S. PATENT DOCUMENTS 6,067,046 A    5/2000 Nichols
6,975,959 B2    12/2005 Dietrich et al.

(Continued)

FOREIGN PATENT DOCUMENTS

GB    2423442 A    8/2006

OTHER PUBLICATIONS

"U.S. Appl. No. 12/755,289 , Response filed Sep. 25, 2013 to Non Final Office Action mailed Apr. 25, 2013", 15 pgs.

(Continued)

*Primary Examiner* — Quan-Zhen Wang
*Assistant Examiner* — Stephen Burgdorf
(74) *Attorney, Agent, or Firm* — Maschoff Brennan

(57) ABSTRACT

In various exemplary embodiments, a system and associated method to provide management of a plurality of electronic elements in a datacenter is disclosed. The system includes a datacenter management system coupled to a wireless network to receive information regarding a spatial location of a handheld device within the datacenter. The datacenter management system provides information to the handheld device related to each of the plurality of electronic elements. The datacenter management system includes a management processor to process information related to each of the plurality of electronic elements and a database to store information related to each of the plurality of electronic elements.

15 Claims, 10 Drawing Sheets

(58) Field of Classification Search
USPC ............... 340/8.1, 10.1, 995.17; 455/404.2; 707/E17.005, 705; 709/220, 223
See application file for complete search history.

(56) References Cited

U.S. PATENT DOCUMENTS

| | | | |
|---|---|---|---|
| 7,191,090 B1* | 3/2007 | Cunningham | G01S 3/8083 702/150 |
| 7,290,000 B2 | 10/2007 | Meifu et al. | |
| 7,590,487 B2 | 9/2009 | De Silva | |
| 7,642,914 B2 | 1/2010 | Campbell et al. | |
| 7,667,855 B2 | 2/2010 | Piazza | |
| 7,841,513 B1 | 11/2010 | Katzer et al. | |
| 8,285,302 B1 | 10/2012 | Espy et al. | |
| 8,325,180 B2 | 12/2012 | Kim | |
| 8,803,660 B2 | 8/2014 | Martin et al. | |
| 2002/0095487 A1 | 7/2002 | Day et al. | |
| 2003/0008671 A1 | 1/2003 | Lundgren et al. | |
| 2003/0095032 A1 | 5/2003 | Hoshino et al. | |
| 2005/0212911 A1 | 9/2005 | Marvit et al. | |
| 2007/0018820 A1 | 1/2007 | Chand et al. | |
| 2007/0090951 A1 | 4/2007 | Chan et al. | |
| 2008/0229255 A1 | 9/2008 | Linjama et al. | |
| 2009/0017799 A1 | 1/2009 | Thorn | |
| 2009/0282140 A1 | 11/2009 | White et al. | |
| 2010/0013603 A1 | 1/2010 | Chatani et al. | |
| 2010/0225470 A1* | 9/2010 | Marwah | G06Q 10/06 340/539.13 |
| 2011/0047263 A1 | 2/2011 | Martins et al. | |
| 2011/0050422 A1 | 3/2011 | Pflueger | |
| 2011/0136511 A1 | 6/2011 | Patoskie et al. | |
| 2011/0209082 A1* | 8/2011 | Conzola | G06F 17/509 715/771 |
| 2011/0218730 A1 | 9/2011 | Rider et al. | |
| 2011/0235577 A1* | 9/2011 | Hintermeister | G06F 17/30876 370/328 |
| 2011/0241833 A1 | 10/2011 | Martin et al. | |
| 2011/0304463 A1 | 12/2011 | Groth et al. | |

OTHER PUBLICATIONS

"U.S. Appl. No. 12/755,289, Response filed Oct. 19, 2012 to Non Final Office Action mailed Jul. 19, 2012", 15 pgs.
"U.S. Appl. No. 12/755,289, Advisory Action mailed Feb. 6, 2014", 3 pgs.
"U.S. Appl. No. 12/755,289, Examiner Interview Summary mailed Feb. 6, 2014", 4 pgs.
"U.S. Appl. No. 12/755,289, Final Office Action mailed Nov. 20, 2013", 51 pgs.
"U.S. Appl. No. 12/755,289, Final Office Action mailed Nov. 28, 2012", 40 pgs.
"U.S. Appl. No. 12/755,289, Non Final Office Action mailed Apr. 25, 2013", 53 pgs.
"U.S. Appl. No. 12/755,289, Non Final Office Action mailed Jul. 19, 2012", 30 pgs.
"U.S. Appl. No. 12/755,289, Notice of Allowance mailed Apr. 11, 2014", 20 pgs.
"U.S. Appl. No. 12/755,289, Response filed Jan. 20, 2014 to Final Office Action mailed Nov. 20, 2013", 15 pgs.
"U.S. Appl. No. 12/755,289, Response filed Feb. 20, 2014 to Advisory Action mailed Nov. 20, 2013", 15 pgs.
"U.S. Appl. No. 12/755,289, Response filed Jan. 24, 2013 to Final Office Action mailed Nov. 28, 2012", 16 pgs.

\* cited by examiner

HANDHELD DEVICE FOR ON-SITE DATACENTER MANAGEMENT

PRIORITY

This application is a continuation of and claims the benefit of priority to U.S. patent application Ser. No. 12/755,289, filed on Apr. 6, 2010, now issued as U.S. Pat. No. 8,803,660, which is hereby incorporated by reference herein in its entirety.

TECHNICAL FIELD

The present application relates generally to the field of computer technology and, in a specific exemplary embodiment, to a system and method of locating and maintaining elements in a datacenter.

BACKGROUND

In a variety of medium and large-scale environments where electronic equipment is used, numerous pieces of equipment such as servers, routers, switches, and other network equipment must be serviced, upgraded, installed, and maintained. For example, in a multi-seller electronic marketplace, one or more sellers can list their inventory and buyers can purchase the inventory via a networked system, such as over the Internet. The electronic marketplace example can include on-line stores including wholesalers or retailers. In other forms, the electronic marketplace can include banks, world-wide distributed enterprise systems, or on-line auction-sites. In all cases, some degree of equipment installation and maintenance must be implemented to ensure reliability of the electronic environment.

BRIEF DESCRIPTION OF DRAWINGS

Various ones of the appended drawings merely illustrate exemplary embodiments of the present invention and cannot be considered as limiting its scope.

DETAILED DESCRIPTION

Figure 1:
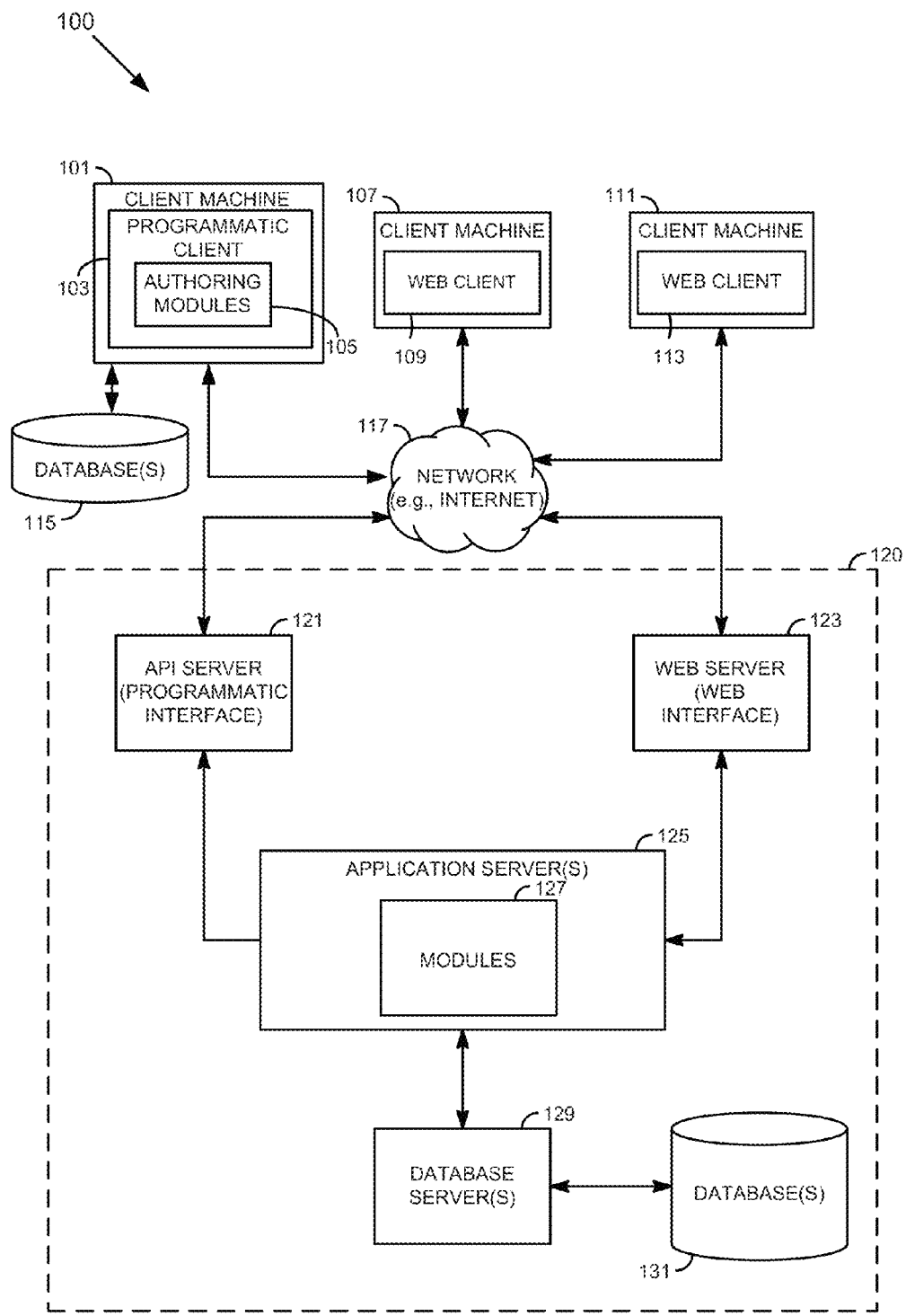
FIG. 1 is a block diagram illustrating an exemplary embodiment of a high-level client-server-based network architecture diagram in which various embodiments of inventive subject matter described herein may be utilized, the network architecture depicts a system used to process end-user queries.

The description that follows includes illustrative systems, methods, techniques, instruction sequences, and computing machine program products that embody at least portions of the inventive subject matter. In the following description, for purposes of explanation, numerous specific details are set forth to provide an understanding of various embodiments of the inventive subject matter. It will be evident, however, to those skilled in the art that embodiments of the inventive subject matter may be practiced without these specific details. Further, well-known instruction instances, protocols, structures, circuits, and techniques have not been shown in detail.

As used herein, the term "or" may be construed in either an inclusive or an exclusive sense. Similarly, the term "exemplary" is construed merely to mean an example of something or an exemplar and not necessarily a preferred or ideal means of accomplishing a goal. Additionally, although various exemplary embodiments discussed below focus on an electronic datacenter environment, the embodiments are given merely for clarity in disclosure. Thus, any type of electronic environment may employ various embodiments of the handheld device and method for on-site datacenter management described herein. Thus, various types of electronic environment using the device or method are considered as being within a scope of one or more embodiments of the inventive subject matter.

In an exemplary embodiment, a system to provide management of a plurality of electronic elements in a datacenter is disclosed. The system includes a datacenter management system, coupled to a wireless network that receives information regarding a spatial location of a handheld device within the datacenter. The datacenter management system provides information to the handheld device related to each of the plurality of electronic elements. The datacenter management system includes a management processor to process information related to each of the plurality of electronic elements and a database to store information related to each of the plurality of electronic elements.

In an exemplary embodiment, a system to provide management of a plurality of electronic elements in a datacenter is disclosed. The system includes a datacenter management means, coupled to a wireless network, for receiving information regarding a spatial location of a handheld device within the datacenter. The datacenter management means also provides information to the handheld device related to each of the plurality of electronic elements. A processing means processes information related to each of the plurality of electronic elements and a storage means stores information related to each of the plurality of electronic elements.

In an exemplary embodiment, a method to provide management of a plurality of electronic elements in a datacenter is disclosed. The method includes receiving information regarding a spatial location of a handheld device within the datacenter, retrieving information related to each the plurality of electronic elements based on the spatial location of the handheld device within the datacenter, and processing and transmitting the information related to each of the plurality of electronic elements to the handheld device.

In another exemplary embodiment, a machine-readable storage medium including a plurality of instructions that, when executed by one or more processors, causes at least one of the one or more processors to perform a method to provide management of a plurality of electronic elements in a datacenter is disclosed. The method includes receiving information regarding a spatial location of a handheld device within the datacenter, retrieving information related to each of the plurality of electronic elements based on the spatial location of the handheld device within the datacenter, and processing and transmitting the information related to each of the plurality of electronic elements to the handheld device. Each of these exemplary embodiments, and others, is discussed in detail, below.

Overview

Management of datacenters generally requires site services employees to perform manual tasks within the datacenters. When the datacenter is large, the tasks are more challenging and can be performed faster with the support of a handheld device, such as a smart phone (e.g., a Blackberry® or iPhone®), personal data assistant, or other device capable of connecting wirelessly to other devices and providing a graphical or textual display to a user of the device (e.g., an employee within the datacenter). Tasks performed manually within a datacenter are becoming more complex with an increase in scale and virtualization of the infrastructure. Some of the tasks may require precise identification of infrastructure elements, as well as real time information about the elements. By using a handheld device connected to the management systems, and equipped with sensors such as a global positioning system (GPS), a magnetometer, an inclination sensor, or other instrumentation known independently in the art, various embodiments of the inventive subject matter described herein provide assistance to the employees performing the management tasks.

The handheld device assists the employee with finding a location of various electronic and other assets, assessing the status of the assets, or providing guidance based on, for example, just-in-time information for the placement, replacement, maintenance, or retirement of one or more of the assets.

The handheld device may use sensors to assists with tasks such as asset identification, positioning, and relocation or maintenance within the datacenter. Information can be downloaded to the device for identifying the asset within a row or a rack within the datacenter. As noted above, the handheld device may use wireless connectivity to retrieve datacenter maps, row and rack inventories, status of assets, or guidance with regard to particular tasks to be performed.

An Exemplary Datacenter Environment

With reference to FIG. 1, a high-level network diagram of an exemplary embodiment of a system 100 with a client-server architecture includes a first client machine 101, a second client machine 107, a third client machine 111, a network 117 (e.g., the Internet), and an information storage and retrieval platform 120. In this embodiment, the information storage and retrieval platform 120 constitutes a commerce platform or commerce server and provides server-side functionality, via the network 117, to the first 101, second 107, and third 111 client machines. A programmatic client 103 in the form of authoring modules 105 executes on the first client machine 101. A first web client 109 (e.g., a browser, such as the Internet Explorer browser developed by Microsoft Corporation of Redmond, Wash.) executes on the second client machine 107. A second web client 113 executes on the third client machine 111. Additionally, the first client machine 101 is coupled to one or more databases 115.

Turning to the information storage and retrieval platform 120, an application program interface (API) server 121 and a web server 123 are coupled to, and provide programmatic and web interfaces respectively to, one or more application servers 125. The application servers 125 host one or more modules 127 (e.g., modules, applications, engines, etc.). The application servers 125 are, in turn, coupled to one or more database servers 129 facilitating access to one or more information storage databases 131. The one or more modules 127 provide a number of information storage and retrieval functions and services to users accessing the information storage and retrieval platform 120. The one or more modules 127 are discussed in more detail, below.

While the exemplary system 100 of FIG. 1 employs a client-server architecture, a skilled artisan will recognize that the present disclosure is not limited to such an architecture. The exemplary system 100 could equally well find application in, for example, a distributed, or peer-to-peer, architecture system. The one or more modules 127 and the authoring modules 105 may also be implemented as stand-alone software programs, which do not necessarily have networking capabilities.

The first 109 and second 113 web clients access the one or more modules 127 via the web interface supported by the web server 123. Similarly, the programmatic client 103 accesses the various services and functions provided by the one or more modules 127 via the programmatic interface provided by the API server 121. The programmatic client 103 is, for example, a seller application (e.g., the "Turbo Lister 2" application developed by eBay Inc., of San Jose, Calif.) enabling sellers to author and manage data items or listings on the information storage and retrieval platform 120 in an off-line manner. Further, batch-mode communications can be performed between the programmatic client 103 and the information storage and retrieval platform 120. In addition, the programmatic client 103 can include, as previously indicated, the authoring modules 105 used to author, generate, analyze, and publish domain rules and aspect rules. The domain and aspect rules are used in the information storage and retrieval platform 120 to structure the data items and transform queries. Such domain and aspect rules are known independently in the art.

Figure 2:
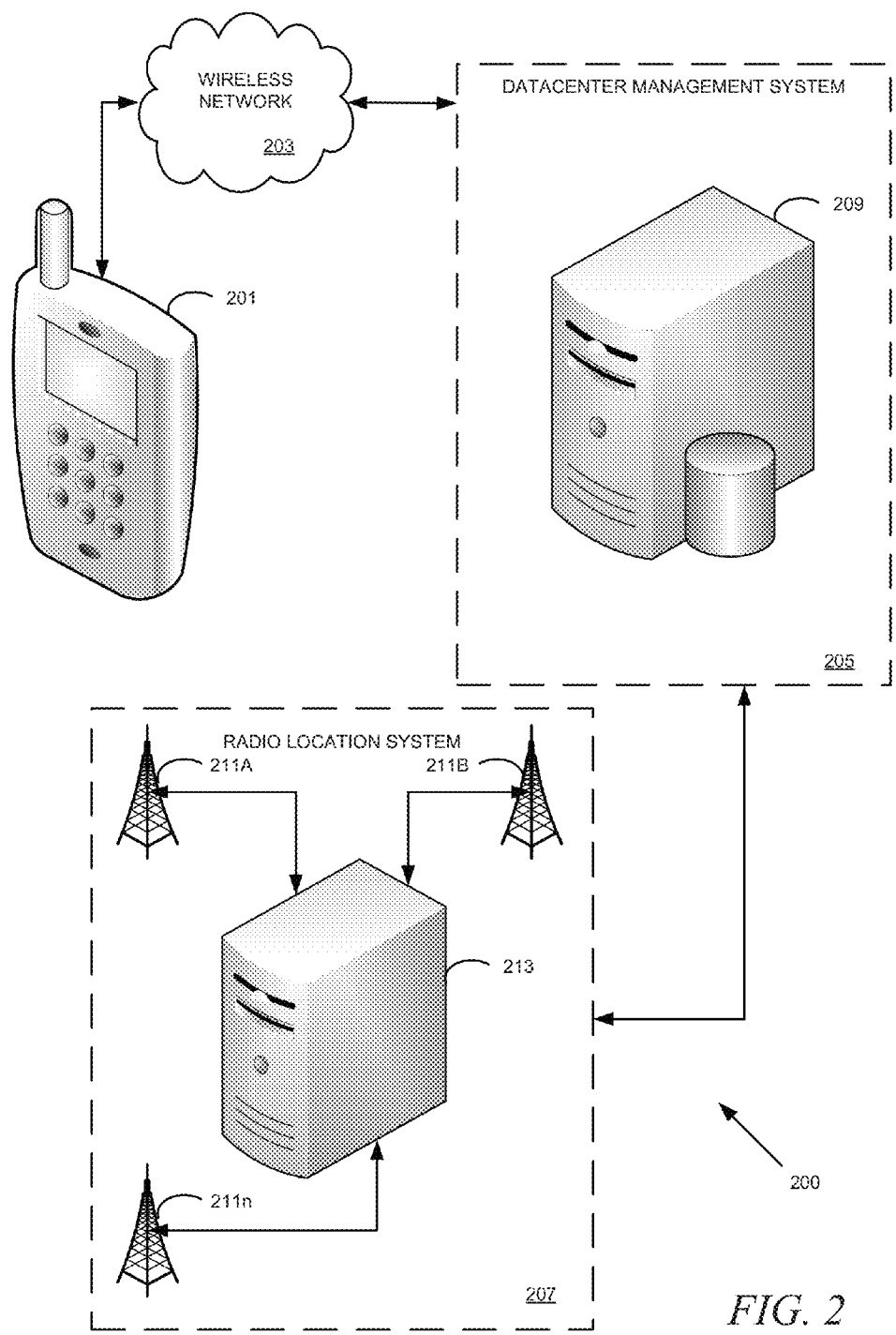
FIG. 2 is a block diagram illustrating an exemplary embodiment of a high-level depiction of a device used for on-site datacenter management.

Referring now to FIG. 2, a block diagram illustrates a high-level depiction of a datacenter 200 utilizing on-site datacenter management. The datacenter 200 is shown to include a handheld device 201 to receive pertinent information (described in detail, below) about the datacenter 200 through a datacenter management system 205 coupled to a wireless network 203. The datacenter 200 may be located, at least partially, within one or more physical facilities. The datacenter 200 can include, for example, a traditional computing facility or an internal or external cloud computing facility. The datacenter management system 205 includes a management processor 209 on which various hardware and software components, discussed herein, may be located. The management processor 209 may include, for example, one or more processors and a database (not shown explicitly). The database includes information related to a spatial location (e.g., datacenter, row, rack, chassis, etc.) of a number of electronic components, assets, or elements. Additionally, the database can include information related to electrical specifications, cabling, maintenance dates, updates, software and firmware version numbers, and so on for each of the racks or electronic elements within the datacenter. In an exemplary embodiment, the database may be located remotely from the management processor 209 or as a stand-alone unit. An optional radio location system 207, operating within the datacenter 200 if present, is shown to include several antennas 211A ... 211N coupled to a positioning computer 213.

System Description

The handheld device 201 may include a cellular communications radio (e.g., global system for mobile communications (GSM)) capable of data transmission (e.g., using general packet radio service (GPRS)) connected to the Internet through a cellular phone provider network (not shown). The handheld device 201 may also include a global position system (GPS). These characteristics are discussed in more detail, below. The handheld device 201 may have other means of data transmission including WIFI using, for example, a wireless networking standard such as IEEE 802.11-2007 (e.g., 802.11b, 802.11g, or 802.11n). The handheld device 201 includes multiple internal sensors (not shown but found commonly in many contemporary communications devices such as smart phones). The multiple internal sensors may be based on, for example, accelerometers and can detect positional information including inclination, orientation, and position. In a specific exemplary embodiment, the handheld device 201 is a smart phone.

To facilitate some of the data acquisition tasks described herein, the handheld device 201 may also include a camera and optional readers to read optical (e.g., bar codes) and non-optical (e.g., radio-frequency identification (RFID) tags) identification labels. A client software application running in the handheld device 201, described below, provides a user with functionalities to perform various installation and maintenance tasks of the datacenter management system 205. The client software application interacts with hardware of the handheld device 201, as well as with a management application residing on, for example, the management processor 209. The handheld device 201 thus interacts with the management processor 209 through the wireless network 203.

In a situation where a physical facility makes a GPS portion of the handheld device 201 unusable (e.g., due to blocked signals), the optional radio location system 207 operates through the several antennas 211A ... 211N in the datacenter 200 to provide indoor positioning to the handheld device 201. The several antennas 211A ... 211N listen to radio transmissions of the handheld device 201 and, based on a relative receiving time of the transmissions as processed and determined by the positioning computer 213, determine a spatial position of the handheld device 201. The spatial position is sent back to the handheld device 201 through the wireless network 203 to provide for more precise positioning.

The handheld device 201 is assigned to an employee performing tasks within the datacenter 200. The datacenter management system 205 provides a back end for the client software application running within the handheld device 201. The management processor 209 provides support for the spatial location of the handheld device 201 with regard to management of infrastructure components within the datacenter 200. The management processor 209 also provides inventory, topology, and status for all components within the datacenter 200 and guides a site services employee carrying the handheld device 201 in the tasks to be performed. More detail on each of the components is provided below.

Handheld Device

In addition to functions described above, the handheld device 201 provides radio communication with a cellular network to support voice and data transmissions. Specific communications characteristics of the handheld device 201 are not relevant as long as the performance (e.g., availability, bandwidth, and latency) is sufficient for a given application. For example, at a minimum, one application requires communications to function in an environment with a potentially high level of radio interference. In various exemplary embodiments, the handheld device 201 operates on a wireless network radio to communicate electronically, including data connectivity, with the wireless network 203 within the datacenter 200. The data connectivity is used to access various applications running on the management processor 209. Data connectivity can be accomplished through, for example, the wireless network 203, or, alternatively or in conjunction with, the Internet by using a data portion of the cellular network (not shown).

Figure 3A:
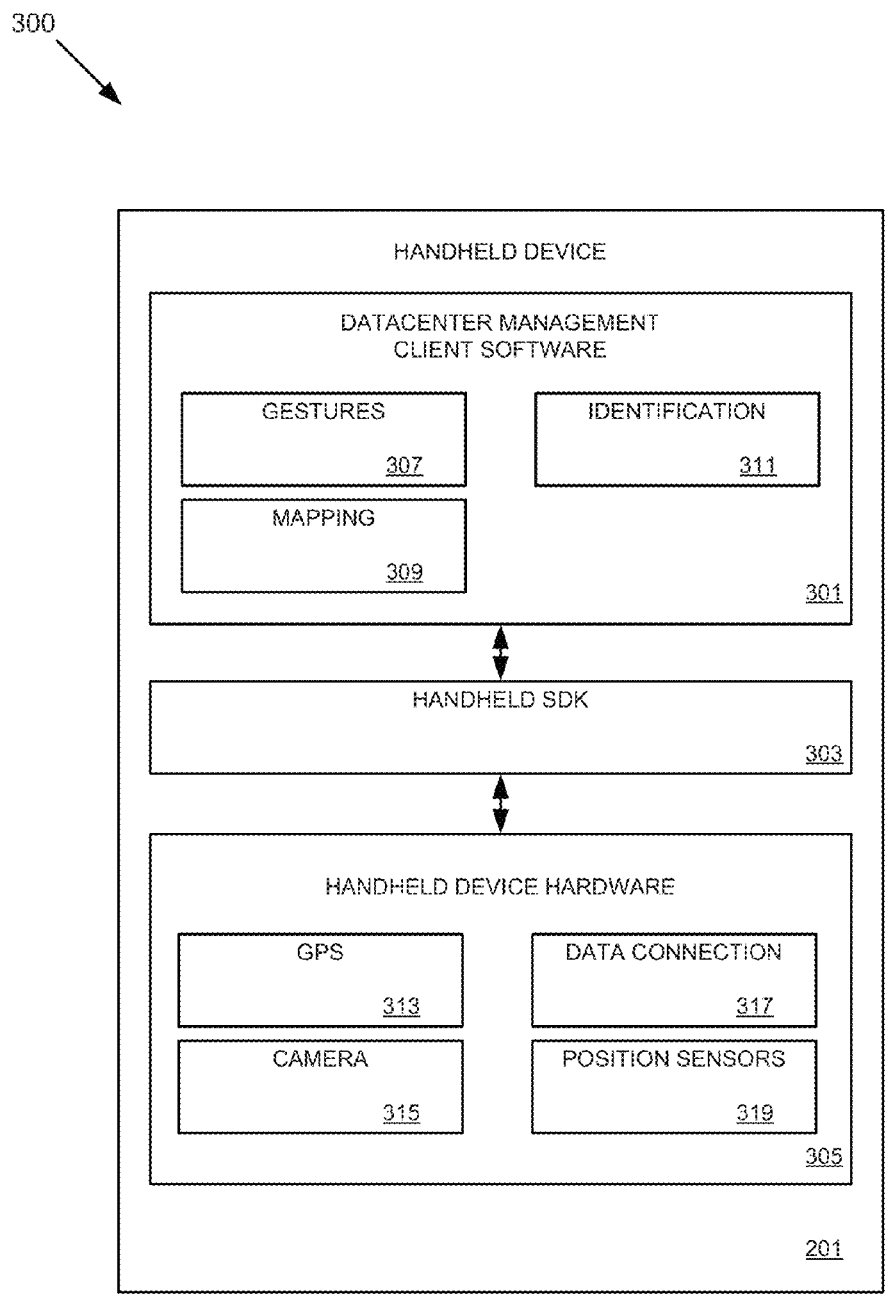
FIG. 3A is a block diagram illustrating an exemplary embodiment of client architecture employed by the device of FIG. 2.

With reference now to FIG. 3A, the handheld device 201 is shown to include a datacenter management client-software engine 301, a handheld software development kit (SDK) interface 303, and a handheld device hardware component 305. The handheld device hardware component 305 is shown to include a GPS component 313, a digital camera 315, a data connection component 317, and one or more position sensors 319.

The handheld device 201 also includes a display screen (not shown) to display graphics (such as photographs, maps, and wiring schematics). Thus, a resolution of the display screen should be sufficient to represent the datacenter infrastructure without requiring an unnecessary pan out. The display screen may also be touch sensitive and may support gestures like flipping pages, scrolling up or down, zooming in or out, or clicking or double clicking. In certain embodiments, the display screen is able to support millions of colors to assist in proper interpretations of photographs and schematics.

The datacenter management client-software engine 301 is shown to include a gestures component 307, a mapping component 309, and an identification component 311. More details on the datacenter management client-software engine 301 are provided, below.

The handheld SDK interface 303 allows the datacenter management client-software engine 301 to interface with the handheld device hardware component 305 of the handheld device 201. The handheld SDK interface 303 is discussed in detail, below.

The one or more position sensors 319 provide a position in space of the handheld device 201 to the management processor 209 (see FIG. 2). The one or more position sensors 319 can either be located within or merely supported by the handheld device 201. The one or more position sensors 319 measure inclination of the handheld device 201, dynamically, to detect movements like the handheld device 201 pointing up or down, or sweeping from up to down (and vice versa). The one or more position sensors 319 may also provide a magnetometer to measure the handheld device 201 pointing direction with regard to magnetic north, dynamically, to detect movements like pointing left or right, or sweeping from left to right (and vice versa). The handheld device 201 may either provide or support additional sensors, or input ports to read identification tags like RFID, iButton, and so on. These sensors may be indirectly connected to the handheld device 201 through a radio network like Bluetooth. The handheld device 201 exposes these sensors, or the collected identifiers, to the client software.

The digital camera 315 included in the handheld device hardware component 305 has a resolution sufficient to capture either linear or two-dimensional (2-D) bar code identification from a component within the datacenter 200. The handheld device 201 can present photographs to the client software in real time or through a generation of picture files.

With reference again to the datacenter management client-software engine 301, client software running on the handheld device 201 includes a variety of use cases. In one exemplary embodiment, the client software provides a capability to the handheld device 201 to support various ones of the use cases listed, below.

In one use case, the client software provides for management of the task queue. In this case, users of the handheld device 201 (e.g., site service employees) log in and view one or more list of tasks assigned to each of the users individually or assigned jointly to their group. The users can view a context required to perform the tasks and to manage the task life cycle (e.g., acknowledge, update, close). The paradigm for this view is similar to an email inbox.

In another use case, users receive notifications similar to instant messages (IMs) or short messages (e.g., tweets) regarding alerts, broadcasts, or other messages. The notifications may be used for either urgent or non-urgent requests.

In another use case, users receive tasks related to racking and wiring of components. For example, when servers or racks are received on the dock, they need to be installed and wired according to very specific policies and procedures. Thus, a location of the rack, the ports, and power connectors to be used will be calculated in real time based on the policies and procedures using a datacenter model and inventory stored on, for example, the management processor 209 (see FIG. 2.). The users are provided with a datacenter map, rack map, and an overlay defining where and how the equipment should be installed to be compliant with the pre-defined procedures. Using the handheld device 201, the users no longer need to "scan" the equipment to record the asset tags since all updates are provided to the datacenter management system 205 (see FIG. 2) in real-time or near real-time.

In another use case, if a datacenter infrastructure component needs to be returned for repair, or retired from production, the site service employees need to locate the equipment accurately in order to remove the proper component from production. The client software provides a map of the datacenter, and the rack, with an overlay identifying the particular component to remove. In the execution of this use case, the user scans the equipment to record the asset tags.

In another use case, site services employees may need to locate a piece of equipment in order to perform maintenance, repair, or diagnosis. The client software provides a mechanism to locate the equipment and validate the current wiring and connectivity, based on a diagram calculated from the datacenter model hosted on the datacenter management system 205.

In another use case, an audit of a specific configuration within the datacenter 200 (see FIG. 2) utilizes the handheld device 201 to perform the audit and discover components efficiently. In the execution of this use case, the user scans the equipment to record one or more associated asset tags. The client software, in addition to existing business logic (e.g., asset management software) interacts with one or more devices of the handheld device hardware component 305 through the handheld SDK interface 303.

With continuing reference to the datacenter management client-software engine 301, various aspects of the inventive subject matter within the client software of the handheld device 201 are provided by three additional subsystems including the gestures component 307, the mapping component 309, and the identification component 311. Each of the various engines and components described may be hardware, software, or firmware components or a combination thereof.

As discussed briefly above, a gestures component 307 ensures ready access to various components of the handheld device 201 by, for example, merely tapping or swiping a finger over the display screen. As a result, the gestures component 307 enhances efficiency of the user by improving access to various items appearing on the display screen such as multiple pages of schematics and wiring diagrams.

The mapping component 309 provides the user with a map to an accurate location of the user within the datacenter 200 using, for example, the triangulation features of the optional radio location system 207 (see FIG. 2) or the GPS component 313. The map is displayed on the display screen of the handheld device 201. The mapping component 309 in the handheld device 201 can be used for at least two purposes. First, a location of components in the datacenter 200 and the items to be serviced or the location where new items need to be added may be identified on a map representing the datacenter floor, rooms, row, racks, or other elements. The locational capabilities of the handheld device 201 are described in more detail, below. Secondly, a location of the user with regard to the datacenter 200 may be identified on the map. This capability is used to display or focus the display screen on an area within the datacenter 200 in which the user is located. This can be a building, a floor, a room, a row, or a rack located in proximity to the user. In cases where the handheld device 201 is providing the position of the user, the client software uses the handheld SDK interface 303 to retrieve the user position and display an appropriate map. The maps themselves can be served on demand by, for example, the datacenter management system 205. Depending on a zoom level of the displayed map, the maps may represent a datacenter, a room within the datacenter, a rack row within the room, or a particular rack.

Also discussed above, the identification component 311 can couple the handheld device 201 to, for example, optical or non-optical sensors within or supported by the handheld device 201. The handheld device 201 can be used to scan components for either component identification or verification.

Figure 3B:
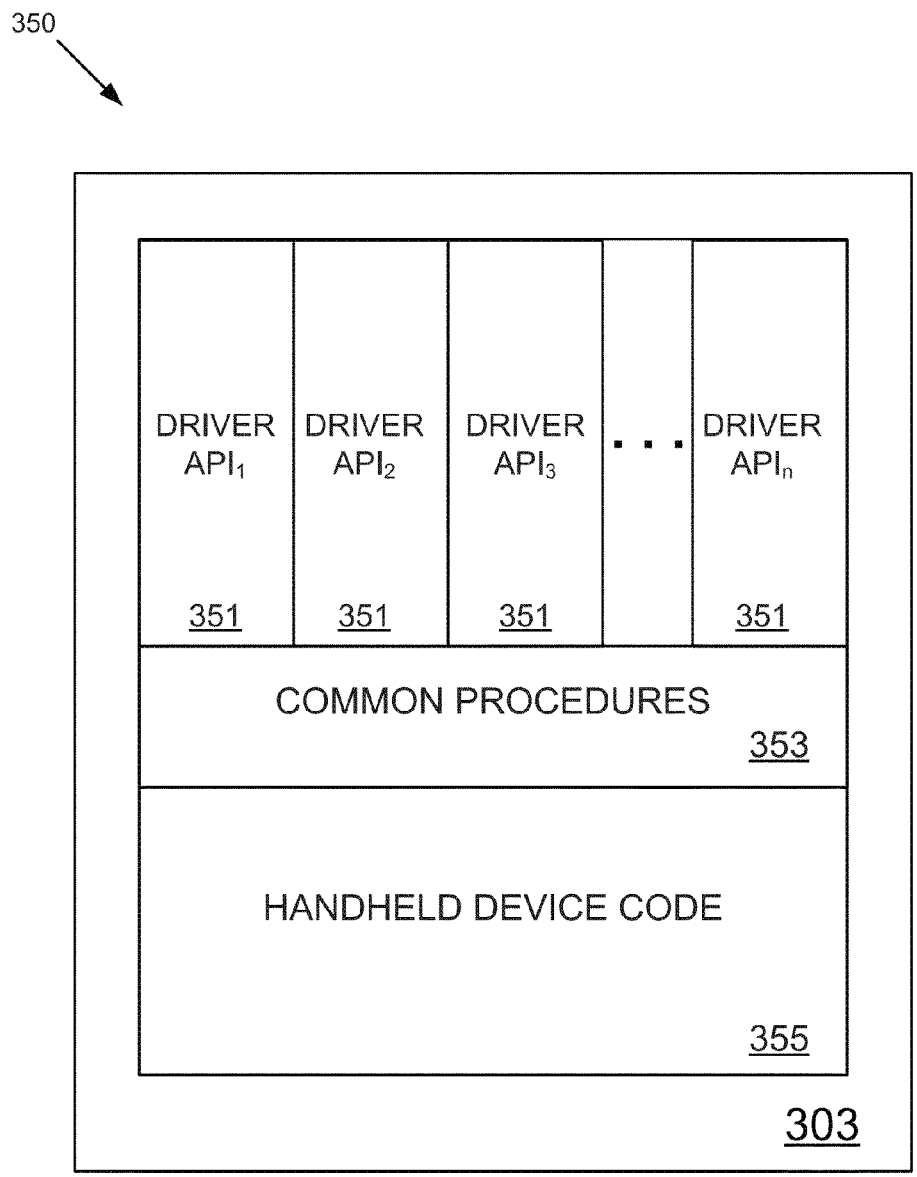
FIG. 3B shows an exemplary embodiment of an electronic interface system usable with the client architecture of FIG. 2.

With reference now to FIG. 3B, a detailed exemplary embodiment 350 of the handheld SDK interface 303 of FIG. 3B is shown to include a handheld device code section 355, a common procedures section 353, and several application program interface (API) driver sections 351. The handheld device code section 355 includes any software components, algorithms, etc., necessary to work with the handheld device 201. Thus, details of the handheld device code section 355 will vary from one handheld device manufacturer (e.g., a smart phone manufacturer) to another. However, details for interfacing any handheld device with software in general, and the several API driver sections 351 in particular, is known independently by one skilled in the art. Further, the handheld device code section 355 may be considered an open solution and is thus directly open to extension by the handheld device manufacturer.

Additionally, the common procedures section 353 provides an interface from each of the several API driver sections 351. The common procedures section 353 may be considered as a sub-component of the SDK interface 300. SDK sub-components are known independently in the art and allow a programmer to create applications for enhancing operation of other software or devices. Here, an operation of each API driver in the several API driver sections 351 is enhanced through the common procedures section 353 to operate with the handheld device 201. Details for the common procedures section 353 vary depending upon details required by a handheld device manufacturer and a particular API interfacing with the handheld device 201. However, the skills required to write code within the common procedures section 353 are known independently in the art.

Figure 4:
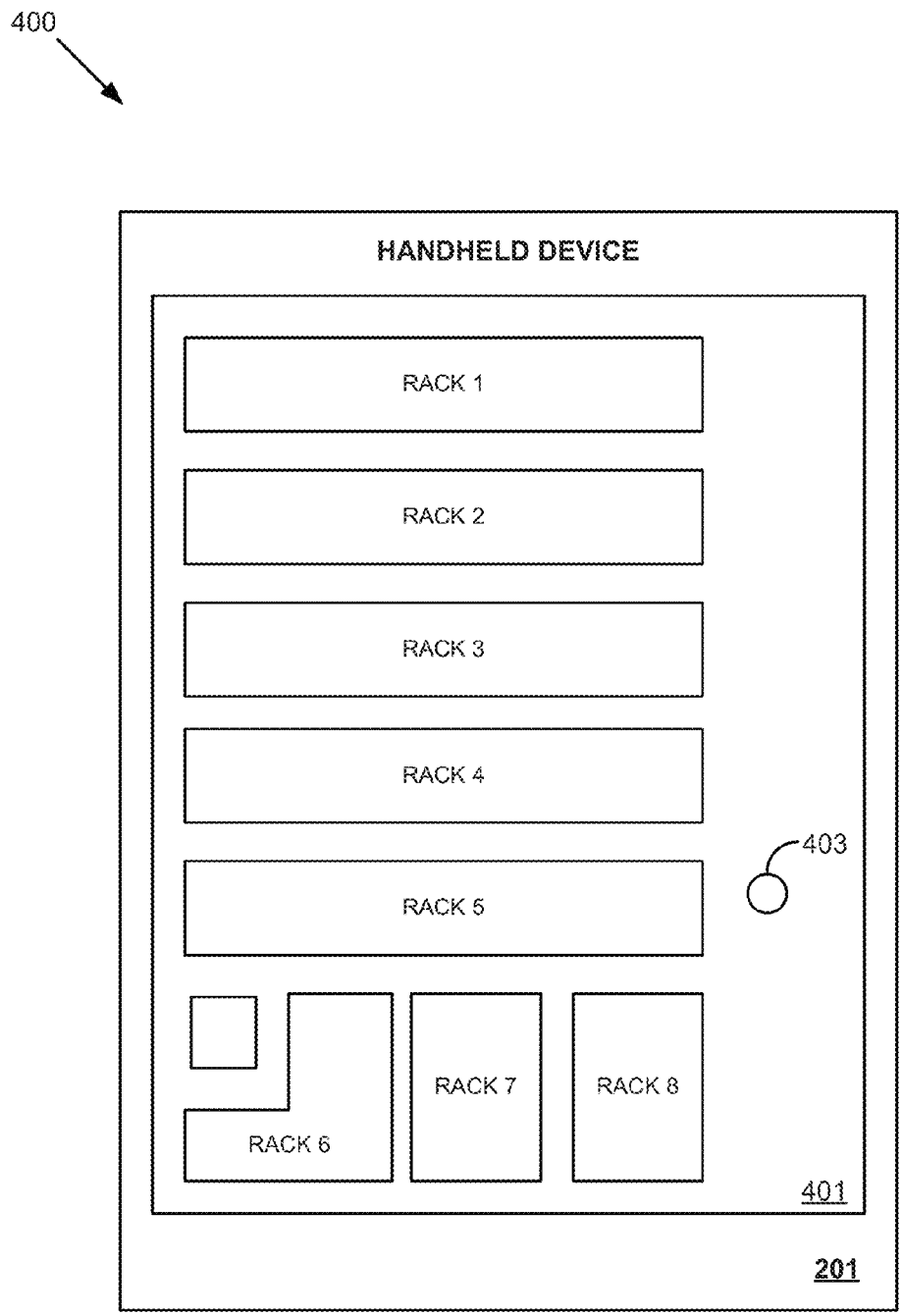
FIG. 4 is an exemplary view of a mapping feature within a datacenter as illustrated on the device of FIG. 2.

Referring now to FIG. 4, a display screen illustrates an exemplary mapping feature 400 on the handheld device 201 having a two-dimensional datacenter map 401 (e.g., a floor plan) showing a number of rack locations (e.g., Rack 1 to Rack 8) along with a relative location 403 of a user of the handheld device 201 within the datacenter. In addition to the number of rack locations, the two-dimensional datacenter map 401 also shows the layout of the floor with various rows between the rack locations. The user can zoom in and zoom out using, for example, gestures supported by the handheld device 201.

Figure 5A:
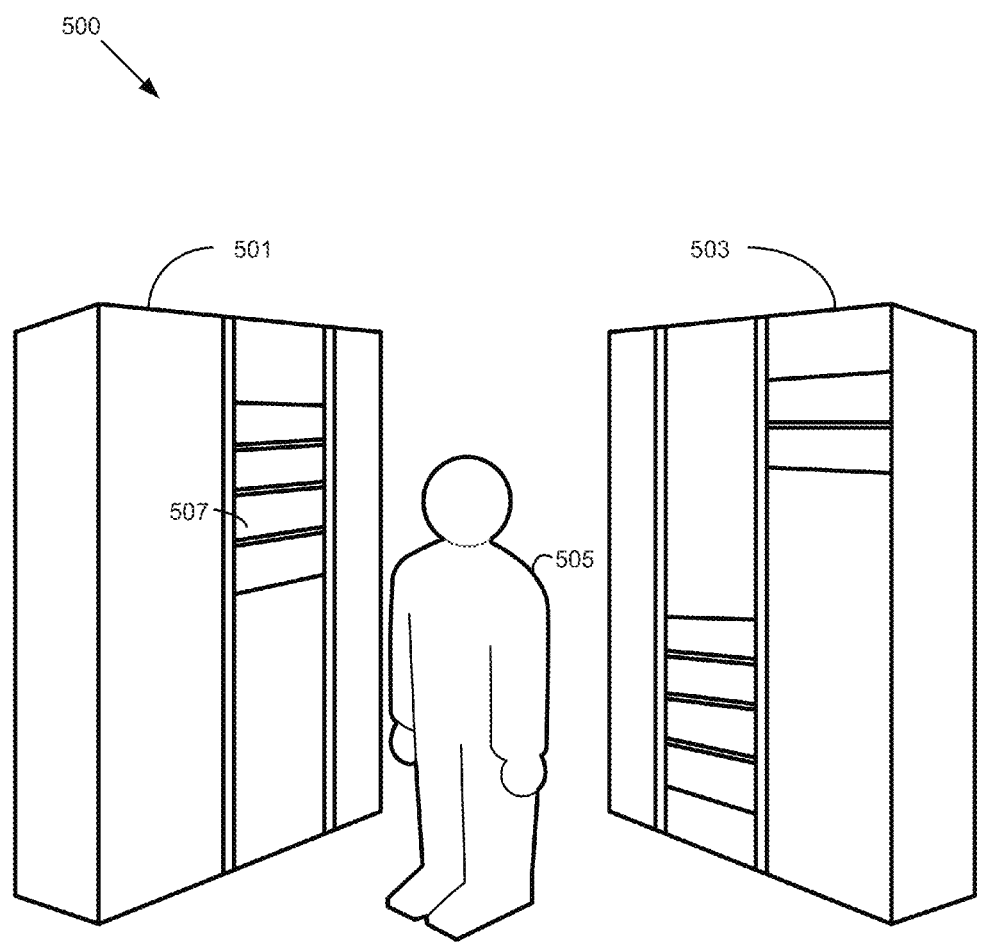
FIG. 5A is an exemplary view of a three-dimensional row view within the datacenter as illustrated on the device of FIG. 2.

With reference to FIG. 5A, when the user viewing a map at a row level, the exemplary display screen may change from the two-dimensional datacenter map 401 to a three-dimensional row-view display 500 of racks and rows. In a specific exemplary embodiment, the three-dimensional row-view display 500 is shown to include a first rack 501, a second rack 503, a user 505, and a rack unit location 507. In this exemplary embodiment, instead of or in addition to relying on the GPS to provide a location, the magnetometer sensor (not shown explicitly) can be used to pan left and right. The inclination sensor can also be used to "look" up or down within the datacenter.

Figure 5B:
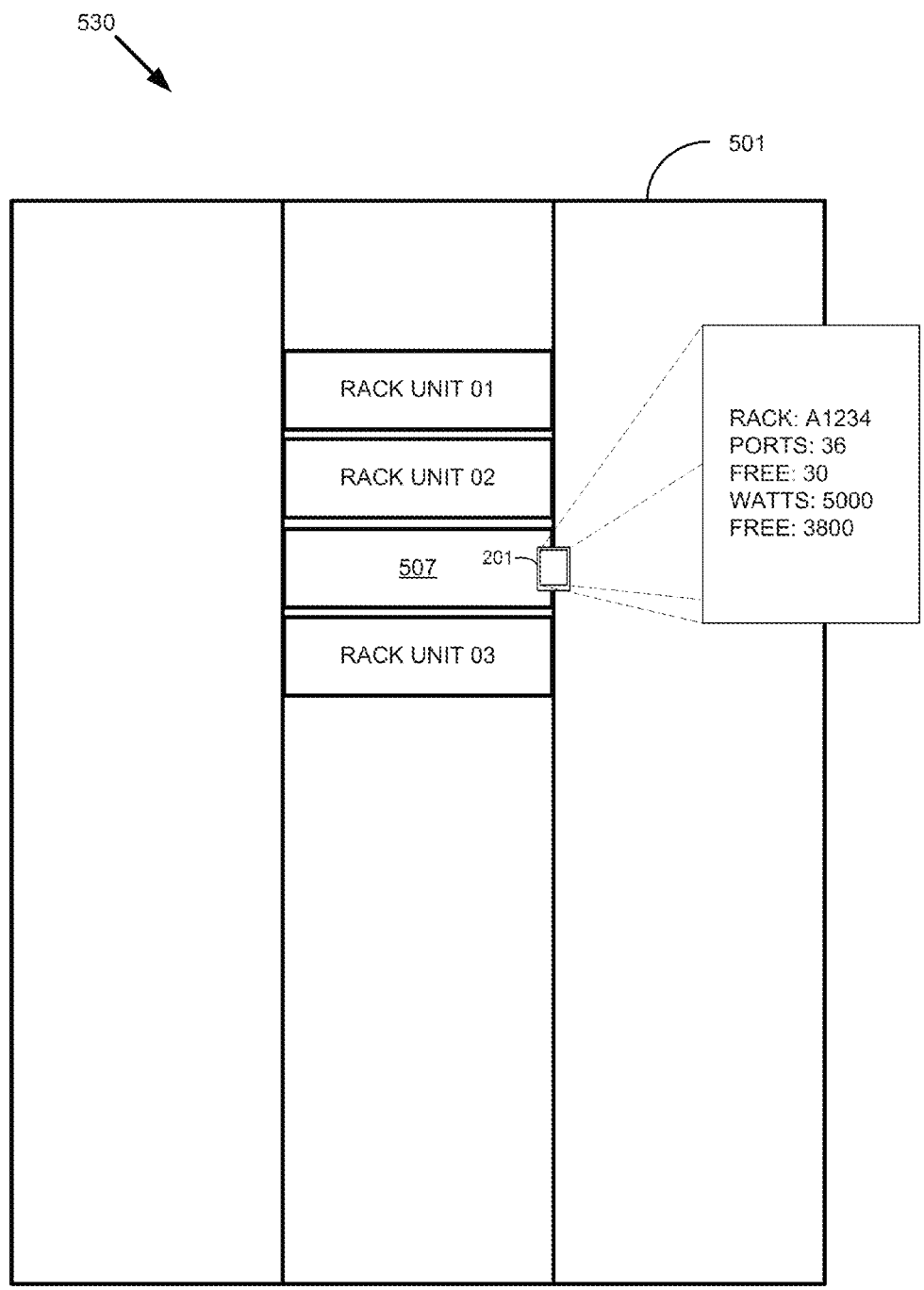
FIG. 5B is an exemplary view of a rack view within the datacenter as illustrated on the device of FIG. 2.

Referring now to FIG. 5B, when the user 505 (FIG. 5A) approaches more closely to one or more of the objects present within the datacenter, such as the first rack 501 and pointing to a specific location on the first rack 501, the display may change to present an updated rack-view 530. The updated rack-view 530 provides more details about the specific location within the first rack 501, such as the rack unit location 507 to which the handheld device 201 is pointing or electrical specifications and maintenance records for electrical elements or components within the specific location within the first rack 501. If the resolution of the positioning system is insufficient for the specific location functionality to work properly, the user 505 may be able to default to an identification capability to scan a tag (not shown explicitly) displayed on the pointed object, such as the rack unit location 507. The map will be updated to represent the identified object. On top of the maps, overlays can be displayed based on a particular configuration or level of zoom.

Figure 5C:
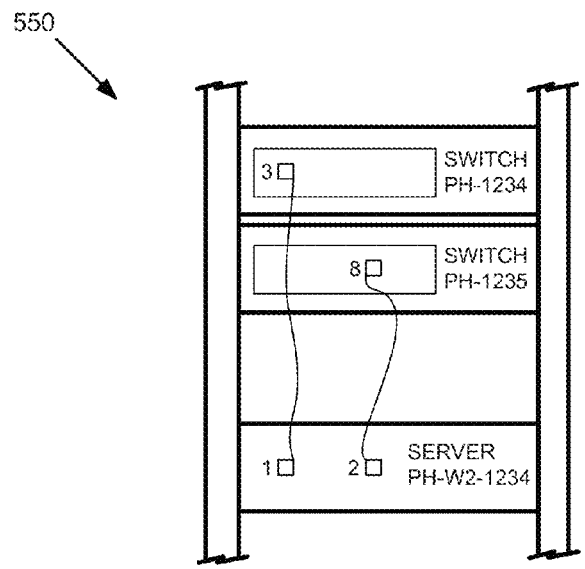
FIG. 5C is an exemplary view of a cabling overlay view within the datacenter as illustrated on the device of FIG. 2.

The types of features that can be displayed are use case dependent, but can be, for example, rows or racks where new hardware needs to be added. The number of machines to be added for each row or rack can be indicated, as well as a position within a rack, thus allowing users to plan the move of machines and follow specific cabling and racking specifications. Additionally, identification of failed status can be overlaid on top of rows, racks, or machines. Information about a particular element, such as a machine, can include identification and other operationally significant parameters. For example, temperature can be indicated as a color overlay, from blue to red, indicating hot spots within the datacenter. As shown in FIG. 5C, a cabling overlay display 550 includes wiring and cabling instructions. The cabling overlay display 550 specifies how, for example, a new server, should be connected to the two top-of-the-rack switches.

Identification

Several use cases require identification of datacenter elements, or assets. The identification is usually done through a barcode or some other mechanisms such as radio-frequency identification (RFID). The handheld device 201 may have different mechanisms to scan the identifiers. The mechanisms can include, for example, optically scanning by using a camera embedded in the handheld device 201. In this embodiment, the user can scan one-dimensional or two-dimensional bar codes or other optically based identifiers. Using a reader connected wirelessly, through, for example, Bluetooth, the user can scan contactless tags like RFID or contact based tags like iButton. After reading the identifier, the client software will transmit the identification to the datacenter management system to retrieve details about a particular asset, or record the asset and its new location. This may require the scanning of the asset itself, and the rack (e.g., the rack unit) or shelf (e.g., the slot) where the asset has been positioned. The identification system, if working with a proximity sensor, can incorporate sufficient spatial resolution to eliminate false readings coming from adjacent tags.

Gestures

Gestures are sets of alternative input methods based on movements detected by various sensors within the handheld device 201 (see FIG. 3A). Aspects of the inventive subject matter described herein can use several built in gestures such as to zoom in, zoom out, scroll up or down, or flip pages. The client application can define new specific gestures. The new specific gestures can include, for example, a swipe from side-to-side when viewing a rack or a row will switch the view to neighboring racks or rows. Pointing a camera within the handheld device 201 up and down a rack can scroll up and down the rack view, allowing a view of various machines from top to bottom (or vice versa). Pointing the camera within the handheld device 201 up or down a rack can be also interpreted as scanning the rack for failed status. The client software queries the datacenter management system for the status of all the elements, components, or machines within the rack.

Datacenter Management System

The datacenter management system can provide the back-end server component for the client software running in the handheld device 201 (see FIG. 3A). The client can be connected to the back-end server using a secure data connection (e.g., HTTPS). In a specific exemplary embodiment, the datacenter management system can include components such as, for example, a datacenter model capturing objects within the datacenter as well as their relationships (e.g., containment, usage, or connectivity); a protocol interface for the client to communicate with the server using a service-oriented protocol (e.g., JavaScript Object Notation and Representational State Transfer (JSON/REST)); business logic implementing the use cases defined, above; a mapping backend to serve maps based on a location of the handheld device 201 (e.g., the mapping backend may dynamically generate the maps, or use bitmaps with appropriate coordinates); and communication with the optional radio location system 207 (see FIG. 2) and an association with the specific device position.

For the racking and wiring task, for example, the datacenter management system provides functions including, for example, management of racking and wiring requests and their association to the appropriate user; presentation of the request as an overlay on the datacenter map with the number of servers to add to each row and can further include color-coding to specify different types of machines; presentation of specific wiring and racking instructions (e.g., a specific position within the rack, specific connections to the network ports, etc.); and recording of the actual rack location and wiring (e.g., if a preferred rack location and wiring scheme was not strongly recommended, or if the recommended scheme could not be used).

Figure 6:
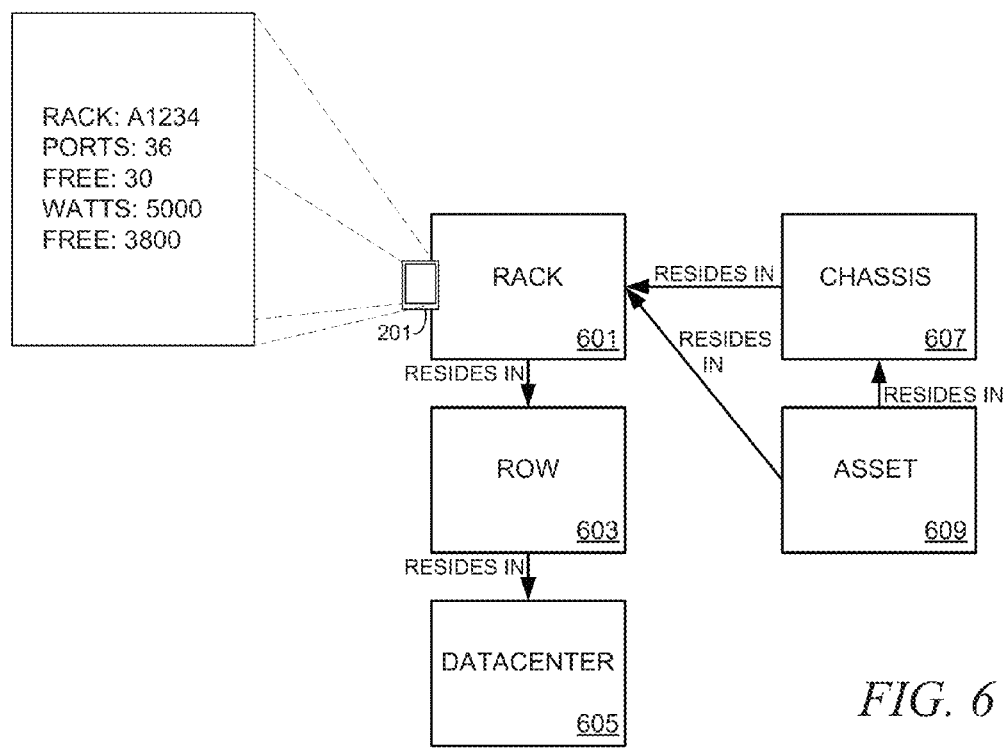
FIG. 6 is an exemplary embodiment of a high-level model depicting the datacenter.

With reference to FIG. 6, an exemplary relationship model can accomplish various tasks, such as those defined, above. The relationship model is shown to include a rack 601, a row 603, and a datacenter 605. Depending upon a location of the handheld device 201 or a way in which the handheld device 201 is currently being used (e.g., to optically scan a barcode or electrically scan a proximate RFID tag), a location within the rack 601 can display information pertinent to the location. In other examples, the handheld device 201 can provide information for an asset 609 residing within either a chassis 607 or the rack 601. Thus pertinent relative dependencies can incorporate and display a relationship used by the datacenter management system. In the exemplary relationship model, each object has its coordinates specified and can include a graphical representation that can be used by the client application during map visualization.

Radiolocation System

Figure 7:
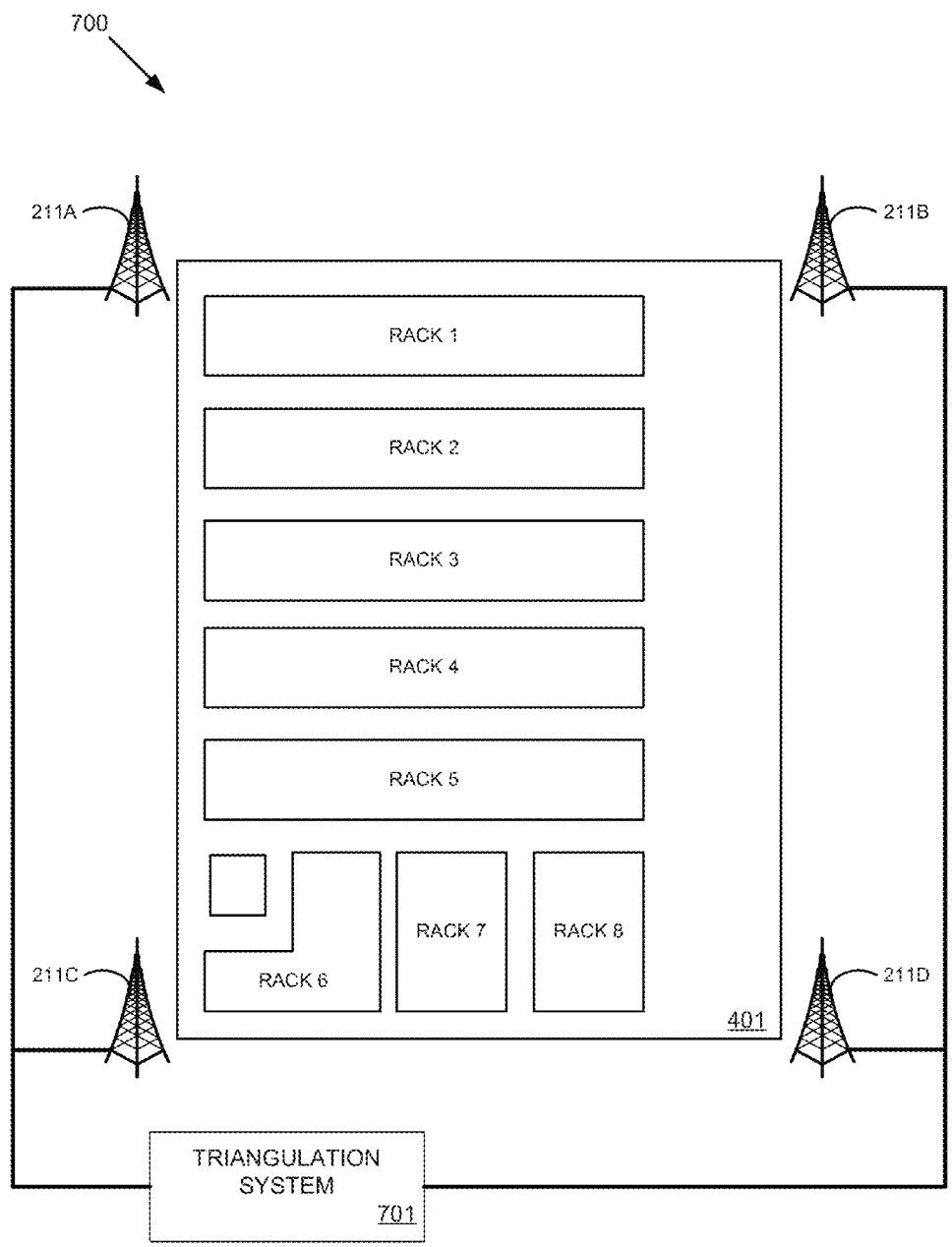
FIG. 7 is an exemplary embodiment illustrating a radio location system within the datacenter.

With reference to FIG. 7, an exemplary radio location system 700 is an alternative to, or may be used in conjunction with, a GPS-based location when, for example, the building structure is preventing the handheld device 201 (not shown explicitly in FIG. 7) from receiving GPS signals in a portion or all locations within the building. The exemplary radio location system 700 is based on a network of several antennas 211A . . . 211D. Signal processing boards within a triangulation system 701 detect a location of each handheld device 201 by tuning in to a frequency used by each handheld device 201. The triangulation system 701 triangulates a position of each handheld device 201 based on a relative signal strength received by the network of several antennas 211A . . . 211D. The location calculated by the exemplary radio location system 700 is then sent back to the handheld device 201 as a supplement or replacement to the onboard GPS. Depending upon the exact location of the handheld device 201, as well as an operational mode being received from the handheld device 201, the datacenter management system can provide spatially-pertinent information to the handheld device 201.

While various embodiments of the inventive subject matter are described with reference to assorted implementations and exploitations, it will be understood that these embodiments are illustrative only and that a scope of the present inventions is not limited merely to those described embodiments. Moreover, the systems and methods described herein may be implemented with facilities consistent with any hardware system or hardware systems either defined herein or known independently in the art using techniques described herein. Many variations, modifications, additions, and improvements are therefore possible.

Modules, Components, and Logic

Additionally, certain embodiments described herein may be implemented as logic or a number of modules, components, or mechanisms. A module, logic, component, or mechanism (collectively referred to as a "module") may be a tangible unit capable of performing certain operations and is configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by cost and time considerations.

Accordingly, the term module should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are either configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and Machine-Readable Medium

Figure 8:
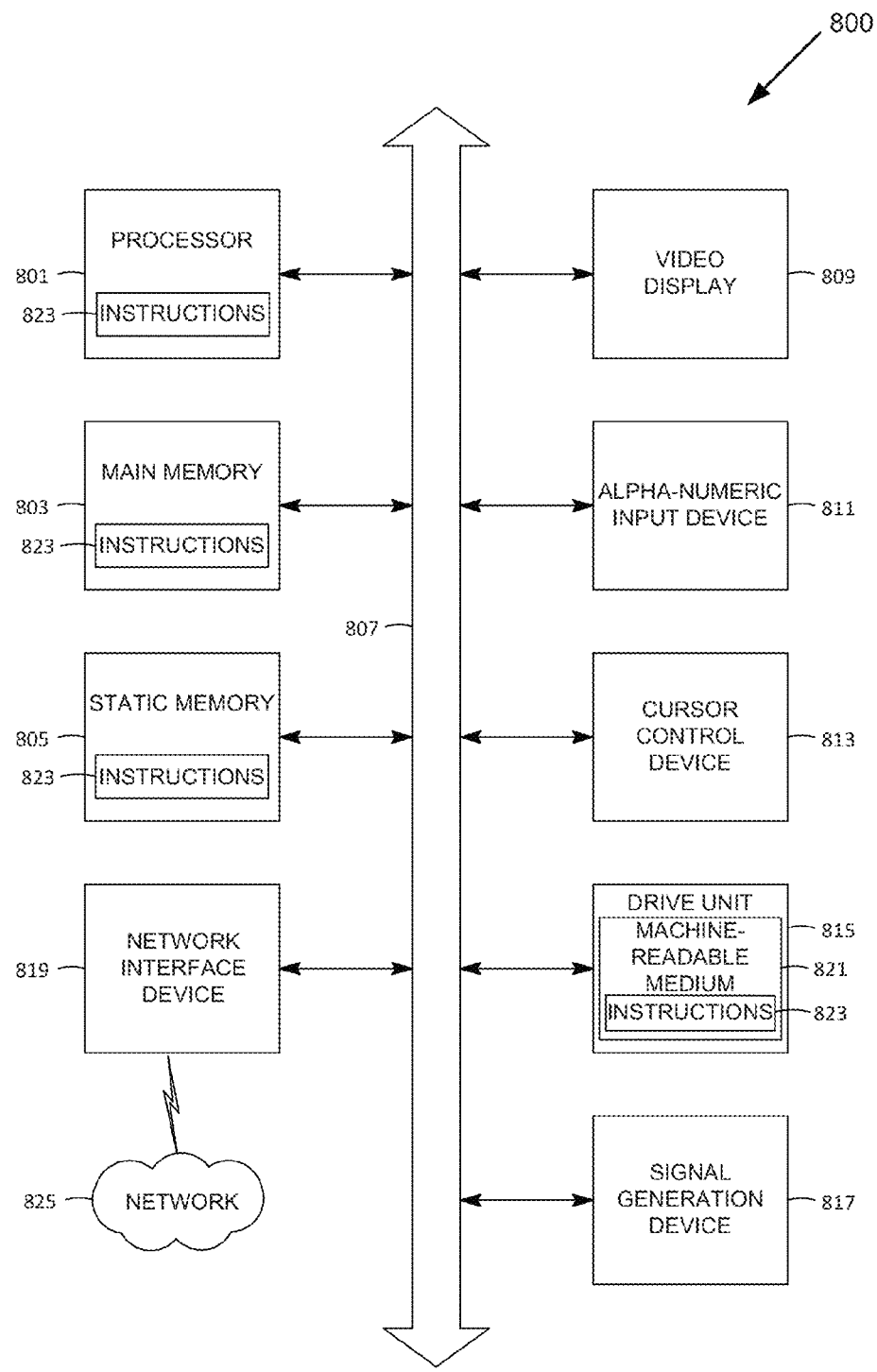
FIG. 8 is a simplified block diagram of a machine in an exemplary form of a computing system within which a set of instructions, for causing the machine to perform any one or more of the methodologies discussed herein, may be executed.

With reference to FIG. 8, an exemplary embodiment extends to a machine in the exemplary form of a computer system 800 within which instructions, for causing the machine to perform any one or more of the methodologies discussed herein, may be executed. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processor 801 (e.g., a central processing unit (CPU), a graphics processing unit (GPU) or both), a main memory 803 and a static memory 805, which communicate with each other via a bus 807. The computer system 800 may further include a video display unit 809 (e.g., a liquid crystal display (LCD) or a cathode ray tube (CRT)). The computer system 800 also includes an alpha-numeric input device 811 (e.g., a keyboard), a user interface (UI) navigation device or cursor control device 813 (e.g., a mouse), a disk drive unit 815, a signal generation device 817 (e.g., a speaker), and a network interface device 819.

Machine-Readable Medium

The disk drive unit 815 includes a machine-readable storage medium 821 on which is stored one or more sets of instructions and data structures (e.g., software instructions 823) embodying or used by any one or more of the methodologies or functions described herein. The software instructions 823 may also reside, completely or at least partially, within the main memory 803 or within the processor 801 during execution thereof by the computer system 800; the main memory 803 and the processor 801 also constituting machine-readable storage media.

While the machine-readable storage medium 821 is shown in an exemplary embodiment to be a single medium, the term "machine-readable storage medium" may include a single medium or multiple media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that cause the machine to perform any one or more of the methodologies of the present invention, or that is capable of storing, encoding, or carrying data structures used by or associated with such instructions. The term "machine-readable storage medium" shall accordingly be taken to include, but not be limited to, solid-state memories, and optical and magnetic media. Specific examples of machine-readable storage media include non-volatile memory, including by way of exemplary semiconductor memory devices (e.g., EPROM, EEPROM, and flash memory devices); magnetic disks such as internal hard disks and removable disks; magneto-optical disks; and CD-ROM and DVD-ROM disks.

Transmission Medium

The software instructions 823 may further be transmitted or received over a communications network 825 using a transmission medium via the network interface device 819 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed. In general, aspects of the inventive subject matter allow a technician or other person to locate, update, maintain, replace, or repair various pieces of electronic equipment of elements with a datacenter. The exemplary embodiments described indicate how a technician can locate the proper piece of equipment, or location for new or replacement equipment, and follow datacenter protocols and procedures to properly install or maintain the equipment.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources.

These and other variations, modifications, additions, and improvements fall within a scope of the present invention is represented by the appended claims. The specification and drawings are, accordingly, to be regarded in an illustrative rather than a restrictive sense.

What is claimed is:

1. A system to provide management of a plurality of electronic elements in a datacenter, the system comprising:
a datacenter management system couplable to a wireless network, the datacenter management system to:
receive location information from a handheld device regarding a spatial location of the handheld device within the datacenter,
receive sensor information from the handheld device regarding positional information including inclination, orientation, and position of the handheld device,
determine the spatial location of the handheld device within the datacenter based on the location information,
determine a position of the handheld device in relationship to a direction in which the handheld device is pointing relative to at least one of the plurality of electronic elements based on the sensor information, provide information to the handheld device related to each of the plurality of electronic elements based on the determined spatial location of the handheld device within the datacenter and a proximity of the handheld device to each of the plurality of electronic elements, direct a change of a screen display on the handheld device from a two-dimensional datacenter map showing a number of rack locations along with a relative location of the handheld device within the datacenter and a layout of a floor with various rows between the rack locations to a three-dimensional row-view display of racks and rows showing racks that are proximate to the handheld device, the screen display being automatically changed based on the determination that the handheld device is proximate to at least one of the plurality of electronic elements, and direct a change on the screen display of the handheld device to a rack view display of a specific rack unit and the plurality of electronic elements within the specific rack unit, the screen display being automatically changed based on a determination that the handheld device is proximate to the specific rack unit and based on a user determined to be pointing the handheld device in a direction of the specific rack unit, the datacenter management system including:
a management processor having one or more processors to process information related to each of the plurality of electronic elements, and
a database to store information related to each of the plurality of electronic elements, the information including a spatial location for each of the plurality of electronic elements.

2. The system of claim 1, wherein the spatial location of the handheld device is determined based on one or more position sensors within the handheld device and without direct user input or scanning.

3. The system of claim 1, wherein the datacenter management system is further to transmit the information related to each of the plurality of electronic elements to the handheld device.

4. The system of claim 1, further comprising a radio location system to provide the spatial location of the handheld device to the datacenter management system.

5. The system of claim 1, wherein the datacenter management system is further to receive sensor information from the handheld device related to at least one of the plurality of electronic elements, the sensor information including at least one of bar code data and radio-frequency identification data.

6. The system of claim 5, wherein the management processor is further to access the database for information related to at least one of the plurality of electronic elements based on the at least one of the bar code data and the radio-frequency identification data and to transmit the information wirelessly to the handheld device.

7. A method of performing management of a plurality of electronic elements in a datacenter, the method comprising:
guiding a user carrying a handheld device in various tasks to be performed;
receiving sensor information from the handheld device regarding positional information including inclination, orientation, and position of the handheld device;
receiving information regarding a spatial location of the handheld device within the datacenter;
determining a position of the handheld device in relationship to a direction in which the handheld device is pointing relative to at least one of the plurality of electronic elements based on the sensor information;
determining the spatial location of the handheld device within the datacenter based on the information regarding the spatial location;
determining whether at least one of the plurality of electronic elements is proximate to the handheld device based on known spatial locations of each of the plurality of electronic elements;
determining whether a specific rack unit is proximate to the handheld device based on a known spatial location of the rack unit;
directing a change of a screen display on the handheld device from a two-dimensional datacenter map showing a number of rack locations along with a relative location of the handheld device within the datacenter and a layout of a floor with various rows between the rack locations to a three-dimensional row-view display of racks and rows showing racks that are proximate to the handheld device, the screen display being automatically changed based on the determination that the handheld device is proximate to at least one of the plurality of electronic elements; and
directing a change of the screen display on the handheld device to a rack view display of the specific rack unit and a plurality of electronic elements within the specific rack unit, the screen display being automatically changed based on the determination that the handheld device is proximate to the specific rack unit and based on the determined spatial location and the determined position of the handheld device indicating that a user is pointing the handheld device in a direction of the specific rack unit.

8. The method of claim 7, further comprising determining the spatial location of the handheld device based on one or more position sensors within the handheld device and without direct user input or scanning.

9. The method of claim 7, further comprising retrieving information related to each of the plurality of electronic elements based on the determined spatial location of the handheld device within the datacenter and a proximity of the handheld device to each of the plurality of electronic elements and without direct user input or scanning, the proximity being determined from the spatial location of the handheld device relative to at least one of the plurality of electronic elements.

10. The method of claim 7, further comprising: accessing a storage database for information related to at least one of the plurality of electronic elements based on the direction in which the handheld device is pointing; and transmitting the information wirelessly to the handheld device.

11. The method of claim 7, further comprising receiving sensor information from the handheld device related to at least one of the plurality of electronic elements, the sensor information including at least one of bar code data and radio-frequency identification data.

12. The method of claim 11, further comprising: accessing a storage database for information related to at least one of the plurality of electronic elements based on the at least one of the bar code data and the radio-frequency identification data; and transmitting the information wirelessly to the handheld device.

13. The method of claim 7, further comprising selecting the information related to each of the plurality of electronic elements to include at least one of maintenance records, cabling information, and electrical specifications for each of the plurality of electronic elements.

14. A machine-readable storage medium not having transitory signals and storing instructions that, in response to being executed by one or more processors, causes a system to perform operations comprising:

guiding a user carrying a handheld device in various tasks to be performed;

receiving sensor information from the handheld device regarding positional information including inclination, orientation, and position of the handheld device;

receiving information regarding a spatial location of the handheld device within a datacenter;

determining a position of the handheld device in relationship to a direction in which the handheld device is pointing relative to at least one of a plurality of electronic elements of the datacenter based on the sensor information;

determining the spatial location of the handheld device within the datacenter based on the information regarding the spatial location;

determining whether at least one of the plurality of electronic elements is proximate to the handheld device based on known spatial locations of each of the plurality of electronic elements;

determining whether a specific rack unit is proximate to the handheld device based on a known spatial location of the rack unit;

directing a change of a screen display on the handheld device from a two-dimensional datacenter map showing a number of rack locations along with a relative location of the handheld device within the datacenter and a layout of a floor with various rows between the rack locations to a three-dimensional row-view display of racks and rows showing racks that are proximate to the handheld device, the screen display being automatically changed based on the determination that the handheld device is proximate to at least one of the plurality of electronic elements; and directing a change of the screen display on the handheld device to a rack view display of the specific rack unit and a plurality of electronic elements within the specific rack unit, the screen display being automatically changed based on the determination that the handheld device is proximate to the specific rack unit and based on the determined spatial location and the determined position of the handheld device indicating that a user is pointing the handheld device in a direction of the specific rack unit.

15. The machine-readable storage medium of claim 14, wherein the operations further comprise retrieving information related to each of the plurality of electronic elements based on the determined spatial location of the handheld device within the datacenter and a proximity of the handheld device to each of the plurality of electronic elements and without direct user input or scanning, the proximity being determined from the spatial location of the handheld device relative to at least one of the plurality of electronic elements.

* * * * *